United States Patent
Baker

[15] 3,697,043
[45] Oct. 10, 1972

[54] BALL VALVE

[72] Inventor: Joseph W. Baker, 193 Rutledge Center, North Plainfield, N.J. 07060

[22] Filed: Dec. 8, 1971

[21] Appl. No.: 206,111

Related U.S. Application Data

[63] Continuation of Ser. No. 3712, Jan. 19, 1970, abandoned.

[52] U.S. Cl............................251/315, 251/317
[51] Int. Cl..............................................F16k 5/06
[58] Field of Search......251/170, 171, 192, 209, 315, 251/316, 317; 137/315

[56] References Cited

UNITED STATES PATENTS

| 1,670,691 | 5/1928 | Riggin | 251/315 |
| 2,926,884 | 3/1960 | Clinkenbeard | 251/316 |
| 3,016,062 | 1/1962 | Zinniger | 251/315 X |
| 3,348,570 | 10/1967 | Nealy | 137/315 |

Primary Examiner—M. Cary Nelson
Assistant Examiner—David R. Matthews
Attorney—Donald S. Olexa et al.

[57] ABSTRACT

An in-line ball valve for on-off, throttling or diverting operation in a fluid line which has a one-piece housing with integral and axially aligned inlet and outlet ports or chambers terminating at orifices in adjacent walls of the valve's main cavity is disclosed. The ball is held between an annular sealing ring and an annular support ring coaxially aligned in an access bore of the housing that is positioned between the inlet and outlet ports and is directed at an angle to the common axes of the in-line inlet and outlet ports. The ball has a nonlinear passage which, upon rotation of the ball, is operative selectively to provide and prevent communication between the inlet and outlet ports through the access bore in the housing. The angularly directed access bore is provided with a threaded plug at its outer end which permits adjustment of the sealing ring as well as the torque required to rotate the ball in the valve even while the valve is in operation. Further, the plug can be removed from the access bore to permit repair or replacement of the ball and ring assembly without disturbing the connecting fittings in the fluid line.

6 Claims, 4 Drawing Figures

PATENTED OCT 10 1972

3,697,043

INVENTOR
JOSEPH W. BAKER

BY
Richards & Cifelli
ATTORNEYS

BALL VALVE

RELATED APPLICATION

This application is a continuation of application Ser. No. 3712; filed Jan. 19, 1970 now abandoned.

BACKGROUND OF THE INVENTION

Field of Invention

This invention relates to valves and more particularly, is directed to an improved in-line ball valve assembly for on-off, throttling or diverting operation in a fluid line.

Satisfactory performance of any fluid piping system depends to a large extent upon efficient valve operation in controlling and regulating the flow of the fluids through the piping in which the valves are connected. Many types of valves are available for this purpose, each exhibiting various advantages and disadvantages in its operation, efficiency and maintenance. From the standpoint of ease of operation and excellent operating efficiency, the ball valve of the so-called "floating ball" type is most desirable. Because the sealing element is a spherical plug or ball, its alignment within the valve housing is not essential to a tight shutoff. Accordingly, greater tolerances are permissible in manufacturing the balls and the concave seats of the sealing rings used in the valve assembly. Further, in floating ball valves, the ball is free to move under the influence of the pressure differential across the valve which urges the ball into positive sealing engagement with the concave seat of the downstream sealing ring and the latter into positive sealing engagement with the valve housing seats.

However, ball valves, whether of the floating ball or fixed ball type, have not been particularly desirable from the standpoint of maintenance and repair. Since it is important that pressure drop across a valve be maintained as low as possible, the piping leading into and exiting from the valve should be in axial or in-line alignment. With this arrangement, the spherical plug or ball and its sealing ring seats could only be replaced by inserting them from above, with the sealing rings on opposite sides of the ball and in coaxial alignment with the inlet and outlet pipes.

As normal wear of the sealing rings occurred, the valve would begin to leak and with the sealing rings coaxial with the fluid flow, no adjustment of the forces exerted by the sealing rings on the ball could be made. The only way the leaky valve could be put back in condition was to remove the ball and seats from the access above and replace them with new sealing rings, a new ball or both. To do so required complete disassembly of the valve also requiring shutting down the fluid flow through the piping. Further, if the housing seats for the sealing rings were also worn requiring remachining, the entire valve housing had to be removed from the piping in order to reach the housing seat with the seat machining tool.

Rather than a top loading ball valve, others have been provided which were of the so-called "Split Body" type where the housing was provided in three pieces with the ball and sealing rings contained in the center piece. The end pieces were then bolted on opposite sides of the center piece and into the piping. This type valve permitted the use of the valve as a joint in assembling the piping, but it also was subject to the same maintenance and repair disadvantages as was the top loading ball valve, i.e., the ball or seats had to be replaced to compensate for wear, requiring disassembly of the complete valve housing, and remachining of the housing seat for the sealing rings could only be accomplished by removing the whole valve from the piping.

By the present invention, I have now provided a novel, in-line ball valve of the floating ball type which assures a minimum of pressure drop in the fluid line across the valve assembly and which assembly can be quickly and easily fully assembled and disassembled without removing the valve housing from the connecting pipes. The valve is further provided with means for adjusting the pressure exerted by the sealing rings upon the ball in the valve assembly even while the valve is in service. Such an adjustment extends the useful life of the sealing rings before replacement is required and also permits variable torque settings for rotating the ball in the valve assembly from open to closed positions. Even further, when excessive wear of the housing seats for the sealing rings has occurred, it can be remachined without requiring removel of the valve housing from the piping. Because of the unique arrangement of the parts and adjustments thereof in the valve of the present invention, even greater tolerances are permitted in the manufacture of the ball, the sealing rings and the housing seats than were permissible in the ball valves of the prior art.

SUMMARY OF THE INVENTION

The in-line ball valve of the present invention comprises, generally, inlet and outlet chambers terminating at orifices in adjacent walls of the valve's main cavity. In the illustrated embodiment a one-piece housing has integral and axially aligned or in-line inlet and outlet ports and an access bore or main valve cavity intermediate the inlet and outlet ports and directed at an angle to the common axes of the ports; a first chamber communicating with one of the ports and with a first orifice in the base of the access bore; the first orifice in the access bore being of smaller diameter than the diameter of the access bore; and a second chamber communicating with the other of the ports and with a second orifice in the side wall of the access bore. A rotatable ball is disposed in the access bore or main valve cavity and is held between an annular sealing ring adjacent to and concentric with the base of the access bore and a supporting ring on the opposite side of the ball.

In the illustrated embodiment, the ball has a non-linear passage which in one rotational position of the ball provides communication between the chambers. There is a closure plug threaded into the outer end of the access bore which engages the outer face of the supporting ring. A rotatable shaft extends through the housing into the rotatable ball in the access bore which upon rotation turns the ball to move the non-linear passage to positions selected for controlling fluid passage between the first and second chambers.

DESCRIPTION OF THE DRAWINGS

These and other advantages and features of the present invention will be even more fully understood by reference to the following detailed description when read in conjunction with the accompanying drawings in which.

Figure 1:
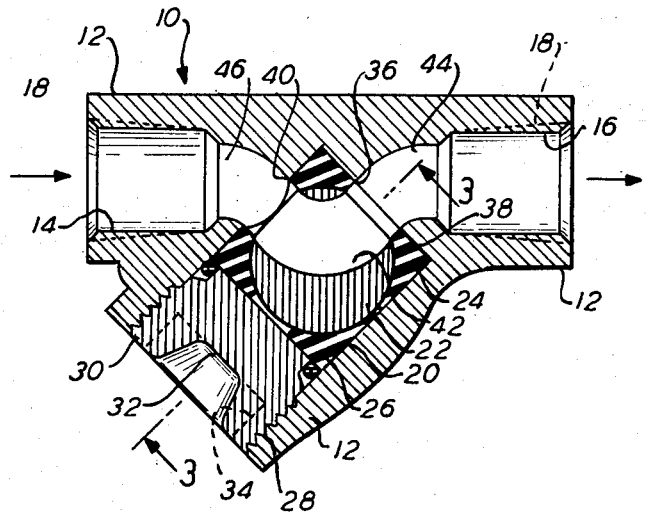
FIG. 1 is a top plan view, shown in cross section, of one embodiment of the in-line ball valve of the present invention.
Figure 2:
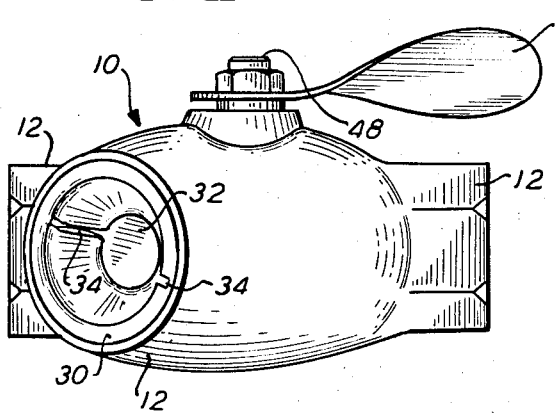
FIG. 2 is an overall perspective view of the in-line ball valve of FIG. 1.
Figure 3:
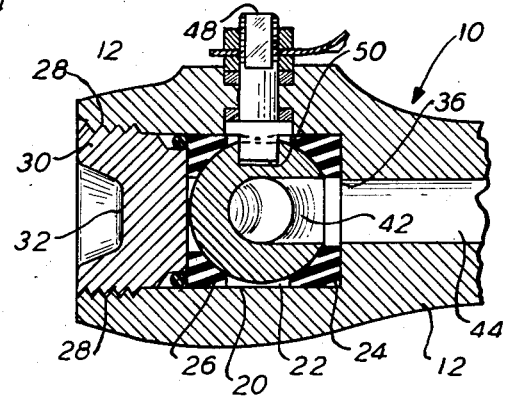
FIG. 3 is a cross sectional view taken approximately along line 3—3 of FIG. 1.

Referring now particularly to FIGS. 1–3, the in-line ball valve, generally designated by the numeral 10, includes a one-piece housing 12 that is provided with an inlet port 14 at one end and an outlet port 16 at the other end. The in-line inlet and outlet ports are axially aligned or substantially parallel with one another and are provided with internal threads 18 to threadably receive the piping (not shown) carrying the fluids to and from the valve 10.

Intermediate the inner ends of the inlet and outlet ports 14 and 16 and directed at an angle to their common axes is an access bore or main valve cavity 20 in which a spherical ball 22 is held between an annular sealing ring 24 and an annular supporting ring 26 placed in coaxial alignment in the main valve cavity 20.

At the outer end of the cavity 20, which is provided with internal threads 28, is an externally threaded closure plug 30, the inner end of which abuts against the outer radial face of the annular supporting ring 26. The outer radial face of the closure plug 30 is provided with a centrally disposed, tapered depression 32 and a pair of diametrically opposed slots 34 extending radially from the depression 32 into the wall of the plug 30 which serves to force the ball against the cavity orifice seat and adjust the ball valve assembly in a manner described more fully hereafter.

At the base of the main valve cavity 20 in a wall opposite the entrance to the cavity is an orifice 36 which is smaller in diameter than the diameter of the cavity 20, thus defining a housing seat 38 for the outer radial face of the annular sealing ring 24. The adjacent or side wall of the cavity 20 has a second orifice 40 which is located intermediate the inner concave face of the annular sealing ring 24 and the annular supporting ring 26. The ball 22 is provided with a non-linear passage 42 which, when the ball is positioned in the access bore 20, will line up with and provide a passage between the first orifice 36 at the base of the access bore and the second orifice 40 in the adjacent side wall of the main valve cavity.

In the embodiment shown in FIGS. 1 through 3, the orifice 36 in the base of the cavity 20 communicates with the outlet port 16 via an outlet chamber 44 and the orifice 40 in the side wall of the access bore 20 communicates with the inlet port 14 via an inlet chamber 46. Thus, when the fluid enters the valve at the inlet port 14 and flows through the chamber 46 to enter the passage 42 in the ball through the orifice 40 and exits from the passage 42 in the ball through the orifice 36 to enter the chamber 44, finally exiting from the valve 10 through the outlet port 16.

Referring now particularly to FIGS. 2 and 3, a valve stem 48 in the form of a shaft is mounted for rotation through the top of the housing 12 and extends into a cooperative hole 50 in the top of the ball 22. At the outer end of the valve stem 48 is a handle 54 which, when rotated clockwise or counterclockwise, is operative to rotate the ball 22 in the same directions to align the ball's flow passage 42 with the cavity orifices 36 and 40 between the first and second chambers 44 and 46. By rotating the handle 54, and thereby the ball 22, to positions where the passage 42 only partially moves out of alignment with the orifices 36 and 40, fluid flow through the valve is throttled to varying degrees.

As with all ball valves, the sealing surfaces of the ball valve of the present invention tend to wear after extended periods of time in service. However, in the ball valve of the present invention, with the ball and ring assembly located in an access bore directed at an angle to the normal axes of the inlet and outlet ports, adjustments for wear of the sealing ring 25, supporting ring 26 and/or the ball 22 can be made even while the valve is in service. As wear occurs it is only necessary to tighten the closure plug 30 by rotating it clockwise in the threaded end of the access bore 20 thereby increasing the pressure exerted by the sealing ring 24 and the supporting ring 26 on opposite sides of the ball 22 to restore the sealing surfaces therebetween to a fluid tight condition. This adjustment can be made even while the valve is in operation by using a tool that cooperates with the depression 32 and the slots 34 in the closure plug 30 to turn the closure plug 30 clockwise in the access bore 20 which will be effective to tighten the pressure exerted upon the ball 22 by the annular sealing ring and the annular supporting ring 24 and 26. This adjustment is also effective to adjust the torque required to turn the handle 54 even to the point of locking the ball 22 in a desired position.

If, after an extensive period of time in use, the annular sealing ring 24 or the annular supporting ring 26 or the ball 22 have become worn to the extent of requiring replacement or if the housing seat 38 has become worn to the extent of needing remachining, it is only necessary to remove the rings 24 and 26 and the ball 22 from the access bore and replace them with new ones. Also, while the ball and ring assembly have been removed from the access chamber, the housing seat 38 can be remachined by inserting the grinding or cutting tool into the access bore without removing the housing 12 from the piping in which the valve 10 is secured.

From the preferred embodiment of the valve of the present invention illustrated in FIGS. 1 through 3, it is seen that the access bore 20 intersects the common axes of the inlet and outlet ports 14 and 16 at an angle of about 45° when viewed in the direction of the fluid through the valve. This embodiment is preferred because the change in direction of the flow through the ball valve assembly is maintained at a minimum while the pressure drop across the valve assembly is also effective to urge the ball 22 into sealing engagement with the sealing ring 24 and the latter into sealing ring 24 and the latter into sealing engagement with the housing seat 38 by virtue of its being on the downstream side of the passage 42 in the ball 22. Nonetheless, the main valve cavity can be directed to the common axes of the inlet and outlet ports at any angle up to 90° while still maintaining the positive effect of the pressure drop for urging the sealing surfaces into sealing engagement within the valve, even though some increase in pressure drop will necessarily occur. The sacrifice in pressure drop occurs because of the increased change of direction in the fluid flow through the valve assembly as the angle between the access bore and the inlet and outlet ports increase. It is also apparent that the angle between the main valve cavity and the common axes of the inlet and outlet ports can be reduced below 45°, but to do so would require a somewhat larger housing as the inner ends of the inlet and outlet ports would have to be spaced further apart and the depth of the access bore would have to be greater to provide for clearance between the access bore 20 and the inlet port 14.

Figure 4:
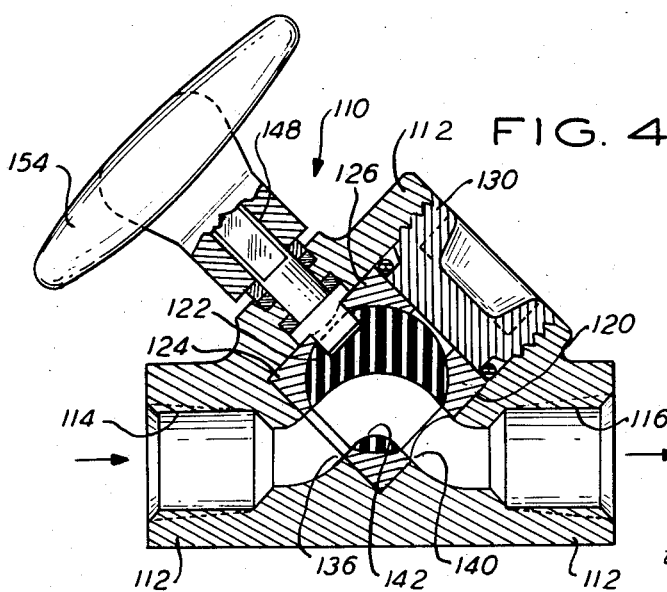
FIG. 4 is a top plan view, shown in cross section, of another embodiment of the ball valve of the present invention.

In a second embodiment depicted in FIG. 4, the valve, generally designated by the numeral 110, is substantially identical to the embodiment depicted in FIGS. 1 through 3, except that the flow through the access bore 120 is in the opposite direction with the fluid first entering the main valve cavity 120 through the orifice 136 at the base of the cavity via the opening in the annular sealing ring 124, then into the passage 142 in the ball 122 exiting therefrom through the orifice 140 in the side wall of the cavity 120 between the coaxial sealing ring 124 and the annular supporting ring 126. In this embodiment, the supporting ring 126 also acts as a sealing ring the same as annular sealing ring 124. Thus, the pressure differential across the valve assembly is effective to urge the ball 122 into sealing engagement with an annular portion of both annular rings 124 and 126 and the latter with the side wall of the access bore 120, rather than against a single sealing ring and housing seat as in the prior embodiment. Also, the access bore 120 intersects the common axes of the inlet and outlet ports 114 and 116, when viewed in the direction of fluid flow, at an angle of about 135° which, as in the prior embodiment, keeps the change in direction of the flow through the valve assembly at a minimum. However, at some sacrifice to pressure drop because of the increased change of direction of flow through the valve assembly, the cavity 120 in the embodiment depicted in FIG. 4 can also be at any angle from 90° with respect to the common axes of the inlet and outlet ports, up to about 135° and beyond. It is apparent that the pressure drop would be decreased through the valve assembly as the angle of intersection between the access bore 120 and the common axes of the inlet and outlet ports 114 and 116 is increased from 90° up to and beyond 135° as a result of a decrease in the extent of directional change the fluid flow must undertake to negotiate the passages through the valve assembly.

Merely to illustrate another rotational axis for the ball 122, the valve stem 148 is mounted in the housing 112, from the front of the valve rather than from the top. The axis of the stem 148 is perpendicular to the axis of the access bore 120 and is such that the rotational axis of the ball 122 is in line with the center of the orifice 140. Thus, the ball is rotatable about the orifice 140 to move the passage out of and into alignment with the orifice 136 upon turning the handle 154.

The valve 110, in an identical manner to the valve of the prior embodiment, is adjusted to compensate for wear by tightening the closure plug 130 in the access bore 120, which adjustment can be made even while the valve is in service. Also, when worn beyond the ability to be so adjusted, the rings 124 and 126 and the ball 122, can be readily replaced without removing the housing 112 from the connected lines, merely by removing the closure plug 130 and withdrawing the ball and ring assembly.

In any embodiment of the valve assembly of the present invention, the sealing rings or the supporting rings or both can be made of relatively soft resilient materials, such as rubber, nylon, polyethylene, polypropylene, Bakalite, brass, bronze, monel metal, and the like or of relatively hard materials, such as cast iron, and cast or forged steel. Similarly, the ball can be made of the same relatively soft or relatively hard materials, the specific material selected being dependent only upon the type of service the ball will be called upon to perform.

Having thus described with particularity two specific embodiments of the ball valve of my invention, it is apparent that many changes and variations can be made in the form and structure thereof without departing from the scope of the invention as defined in the appended claims.

The embodiments of this invention in which an exclusive property or privilege is claimed are defined as follows:

1. An in-line ball valve comprising
   a housing containing
      a single inlet port and a single outlet port, the ports being substantially coaxial for connection in straight piping
      a generally cylindrical main valve having inlet and outlet orifices, one located in the base of the cavity and the other in an adjacent wall
      inlet and outlet chambers providing fluid communication between their respective ports and orifices.
   a ball, having a flow passage for fluid communication with the orifices, located within the main valve cavity
   a closure plug in the entrance of the cavity which forces the ball toward one of the orifices
   means for rotating the ball to control fluid flow through the valve.

2. The in-line ball valve of claim 1 wherein:
   the closure plug forces the ball toward the orifice located in the base of the cavity.

3. The in-line ball valve of claim 1 comprising
   means for adjusting the position of the plug in the cavity entrance to control the pressure exerted against the ball in the direction of the orifice in the cavity base.

4. The in-line ball valve of claim 1 wherein the housing is:
   one piece.

5. The in-line ball valve of claim 1 wherein the flow passage is:
   non-linear.

6. The in-line ball valve of claim 5 wherein the flow passage terminates at the ball surface in ports that are displaced approximately 90° from each other.

* * * * *

UNITED STATES PATENT OFFICE
CERTIFICATE OF CORRECTION

Patent No. 3,697,043            Dated October 10, 1972

Inventor(s) JOSEPH W. BAKER

It is certified that error appears in the above-identified patent and that said Letters Patent are hereby corrected as shown below:

CLAIM 1;

line 31, after "valve" insert --cavity--.

Signed and sealed this 8th day of May 1973.

(SEAL)
Attest:

EDWARD M. FLETCHER, JR.
Attesting Officer

ROBERT GOTTSCHALK
Commissioner of Patents